Figure 1:
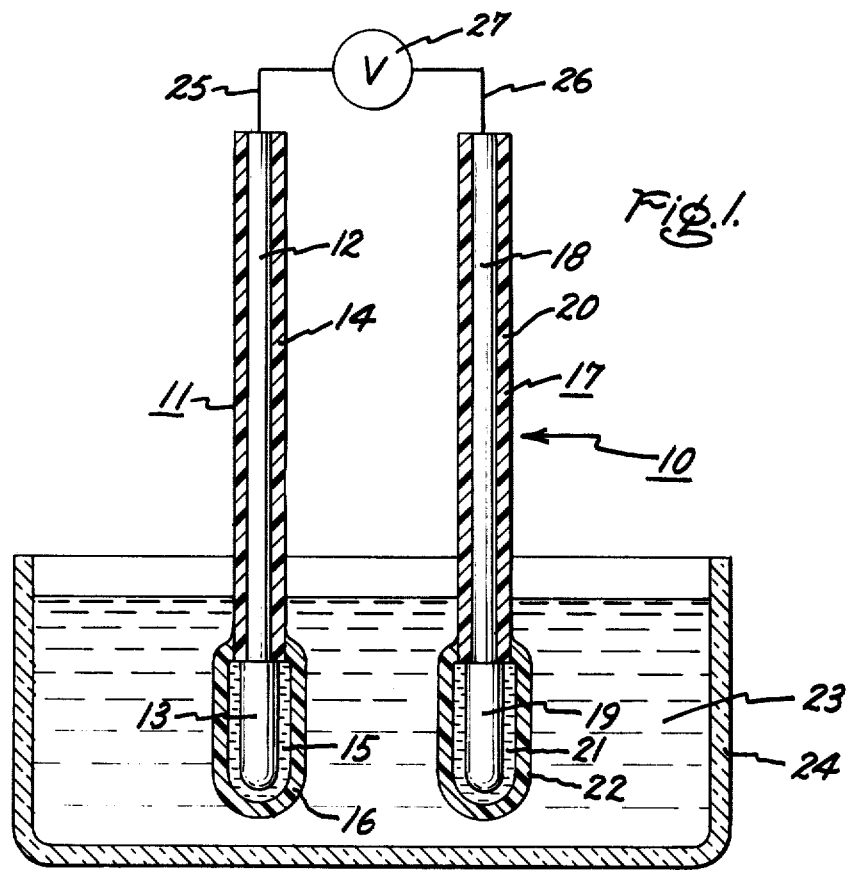

United States Patent [19]

Le Blanc, Jr.

[11] 3,896,020

[45] July 22, 1975

[54] CARBON DIOXIDE AND pH SENSOR

[75] Inventor: Oliver H. Le Blanc, Jr., Schenectady, N.Y.

[73] Assignee: General Electric Company, Schenectady, N.Y.

[22] Filed: Aug. 2, 1974

[21] Appl. No.: 493,863

[52] U.S. Cl....... 204/195 M; 204/195 P; 204/195 R
[51] Int. Cl. .......................................... G01n 27/46
[58] Field of Search............ 204/1 T, 195 R, 195 P, 204/195 M, 195 F

[56] References Cited
UNITED STATES PATENTS

| | | | |
|---|---|---|---|
| 3,705,089 | 12/1972 | Grubb | 204/195 F |
| 3,707,455 | 12/1972 | Derr et al. | 204/195 P |
| 3,709,810 | 1/1973 | Grubb et al. | 204/195 R |
| 3,743,588 | 7/1973 | Brown et al. | 204/195 M |
| 3,770,607 | 11/1973 | Williams | 204/195 P |

*Primary Examiner*—T. Tung
*Attorney, Agent, or Firm*—Paul R. Webb, II; Joseph T. Cohen; Jerome C. Squillaro

[57] ABSTRACT

A sensor for simultaneous measurement of both pH and carbon dioxide partial pressure in a aqueous electrolyte solution is constructed from two membrane hydrogen ion electrodes plus a reference electrode, all three electrodes being placed simultaneously in the solution to be sampled. One membrane hydrogen ion electrode is constructed so as to be insensitive to changes in carbon dioxide partial pressure. The electrical potential difference between it and the reference electrode measures the pH of the sample solution. The other membrane hydrogen ion electrode is constructed so as to be sensitive to carbon dioxide partial pressure: its membrane barrier is not only selectively permeable to hydrogen ions but also permeable to carbon dioxide, as well, and it contains an internal aqueous electrolyte which has no buffers other than bicarbonate ions. The electrical potential difference between the first, carbon dioxide insensitive, hydrogen ion electrode and the second, carbon dioxide sensitive hydrogen ion electrode measures the carbon dioxide partial pressure in the sample solution.

8 Claims, 2 Drawing Figures

CARBON DIOXIDE AND PH SENSOR

Reference is made to copending patent application (RD-7243) Ser. No. 493,864, filed Aug. 2, 1974, in the name of Leonard W. Neidrach entitled "A Bicarbonate Ion Electrode and Sensor." This application is assigned to the same assignee as the present application.

This invention relates to a carbon dioxide and pH sensor and, more particularly, to such a sensor for both in vivo and in vitro applications.

Sensors are employed to determine the content of a specific substance in a fluid or atmosphere. For example, a sensor might be employed to determine the hydrogen ion activity or pH, the oxygen content or carbon dioxide content in a sample.

For in vitro applications, specific ion sensors are known in the prior art for measuring the hydrogen ion activity or pH of a sample. Such a sensor employs a reference electrode and a sensing electrode, such as a glass electrode immersed in a solution, whereby the potential difference between the two electrodes is a function of the concentration of the hydrogen ion in the solution. The salt bridge reference electrode is the most useful. This contains an electrochemically active metallic element in contact with an intermediate, or bridge, salt solution, which separates the metallic element from the sample solution to be measured. Electrical connection between the salt bridge solution and the sample solution is made generally by a liquid-liquid contact through an aperture and generally referred to as a liquid junction. Such sensors which are made of glass employ separate, spaced apart reference electrodes and sensing electrodes or employ a glass sensing electrode surrounded by a reference electrode making a suitable junction with the solution being examined.

In U.S. Pat. No. 3,709,810 there is described and claimed a hydrogen ion selective sensor for particular application as an in vivo sensor. This sensor, which does not employ glass electrodes, has a hydrogen ion selective electrode at one end of an elongated insulating wire which is surrounded by a chamber containing a reference electrode and a reference electrolyte. A wick is provided from the interior of the reference electrolyte chamber to the exterior surface of the sensor to provide an electrolyte bridge. In U.S. Pat. No. 3,705,809 there is described and claimed a reference electrode half cell. This half cell includes an elongated tube of electrically insulating material containing a reference electrode and a gelled reference electrolyte. Both of these patents are assigned to the same assignee as the present application.

My present invention is directed to an improved carbon dioxide and pH sensor which contains two membrane hydrogen ion electrodes and a reference electrode. The membrane barriers in both hydrogen ion electrodes are formed from a material which is permeable to carbon dioxide as well as selectively permeable to hydrogen ions. The internal electrolyte solution in one is well-buffered, while that in the second is unbuffered except that it contains bicarbonate ions. The first hydrogen ion electrode and the reference electrode are used for pH measurements, the two hydrogen ion electrodes are used for carbon dioxide measurements.

The primary objects of my invention are to provide a rugged and accurate sensor for both in vivo and in vitro applications.

In accordance with one aspect of my invention, a sensor for carbon dioxide measurements contains two, spatially separated membrane hydrogen ion electrodes, in one of which the internal electrolyte solution is well-buffered and has a pH which is insensitive to carbon dioxide, and in the other of which the internal electrolyte is unbuffered and contains bicarbonate ions and since the membrane barrier in this second hydrogen ion electrode is permeable to carbon dioxide, as well as selectively permeable to hydrogen ions, the pH of its internal solution will vary with carbon dioxide partial pressure.

Figure 2:
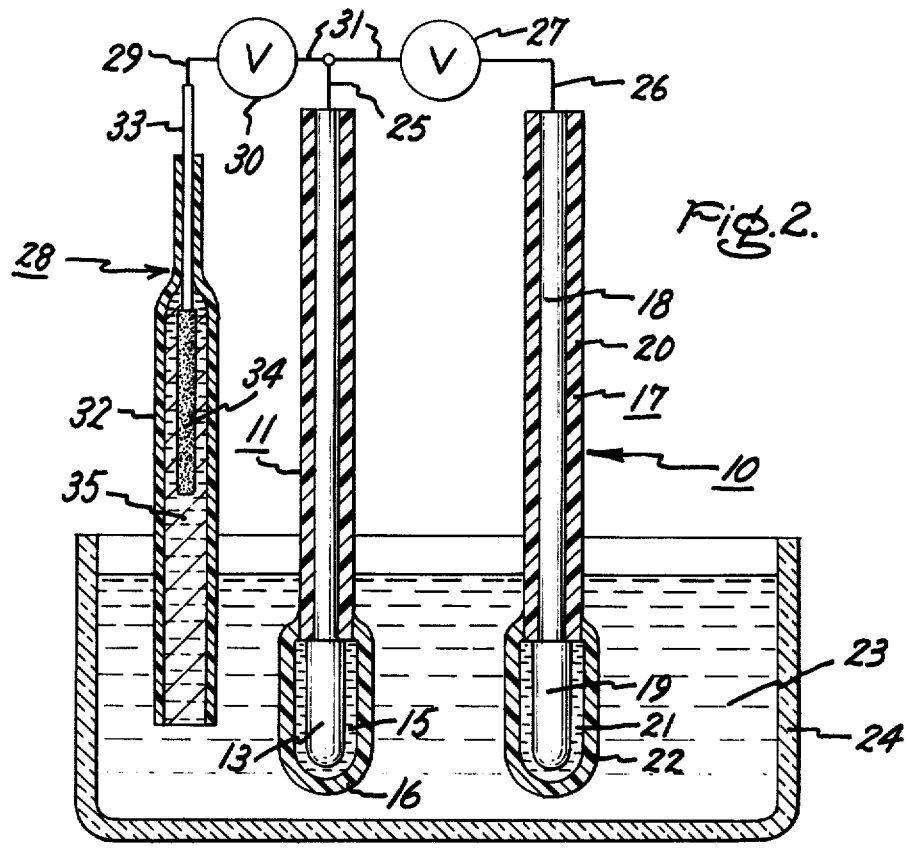

These and various other objects, features and advantages of the invention will be better understood from the following description taken in connection with the accompanying drawing in which:

FIG. 1 is a sectional view of a carbon dioxide sensor made in accordance with my invention; and FIG. 2 is a sectional view of a modified sensor for both carbon dioxide and pH measurements.

In FIG. 1 of the drawing, there is shown generally at 10 a carbon dioxide sensor made in accordance with my invention. A carbon dioxide insensitive hydrogen ion electrode is shown at 11 which has a flexible, metallic, elongated electrode lead 12, such as a silver wire, which is electronically conducting and has an electrochemically active portion 13 at one end thereof. Active portion 13 is, for example, silver and a silver halide other than a fluoride. Electrical insulation 14 surrounds and adheres to electrode lead 12. An electrolyte 15, which is preferably aqueous and immobilized contacts electrochemically active portion 13. An outer membrane sheath 16 selectively permeable to hydrogen ions and also permeable to carbon dioxide encapsulates electrolyte 15 and electrochemically active portion 13 and overlaps and bonds to insulation 14. Active portion 13, electrolyte 15 and membrane barrier 16 form an electrochemically active region at the end of lead 12. Electrolyte 15 contains an ion which enters into equilibrium with electrochemically active region 13, such as halide ion other than fluoride, and also a hydrogen ion buffering system, such as a phosphate or citrate buffer, preferably chosen to have a pH of 5 or below to minimize changes in pH with variations in carbon dioxide partial pressure.

A carbon dioxide sensitive hydrogen ion electrode 17 is shown in the form of a flexible, metallic, elongated electrode lead 18, such as a silver wire, which is electronically conducting and has an electrochemically active region 19 at one end thereof. Electrochemically active region 18 is, for example, silver and a silver halide other than a fluoride. Electrical insulation 20 surrounds and adheres to electrode lead 18. An electrolyte 21, which is preferably aqueous and immobilized, contacts electrochemically active region 19. An outer membrane sheath 22 selectively permeable to hydrogen ions and also permeable to carbon dioxide encapsulates the electrochemically active region 19 and electrolyte 21 and overlaps and bonds to insulation 20. Electrolyte 21 contains an ion that enters into equilibrium with electrochemically active region 19, such as a halide ion other than fluoride, and no buffering system other than bicarbonate ions. Thus, by virtue of the carbon dioxide permeability of membrane sheath 22, the pH of electrolyte 21 will vary with the partial pressure of carbon dioxide.

Electrodes 11 and 17 are shown positioned partially in a solution sample 23 within a container 24. Electrical leads 25 and 26 connect electrodes 11 and 17 to a high impedance voltmeter 27. The terminal voltage from the sensor in operation will be a function of the carbon dioxide partial pressure in equilibrium with it.

I have found that I could form both of the above electrodes by a method of applying successive or alternate elements or layers by immersing or dipping the initial electrode lead in various aqueous and organic solutions. The application of the successive layers is preferably accomplished by such immersion steps but other suitable means include coating, spraying, brushing, etc. The use of immersion steps is described and claimed in the above referenced U.S. Pat. No. 3,798,750.

Each of the electrodes of my invention can be formed by employing for the initial electrode lead or support wire a silver wire. The respective electrochemically active regions 13 and 19 are silver and a silver halide other than a fluoride. The remaining portion of each lead except for the electrochemically active portion and for a short length at each opposite end is insulated with suitable electrical insulation, for example, epoxy resins, polyimides, polyethers, poly(tetrafluoroethylene), silicone rubber or poly(dimethylsiloxane)-poly(bisphenol-A carbonate) block copolymers, or multiple coats of such insulations in order to provide improved bonding, for example, by a first coat of poly(tetrafluoroethylene) followed by a second coat of a poly(dimethylsiloxane) poly-(bisphenol-A carbonate) block copolymer. The electrolyte of electrode 11 must contain a halide ion other than fluoride and a pH buffering system, preferably buffered at pH 5 or below. The electrolyte of electrode 17 must contain a halide ion other than fluoride and also bicarbonate ions. A material specifically permeable to hydrogen ions and also permeable to carbon dioxide is required as an outer sheath for each of the electrodes to encapsulate the respective active regions and the electrolytes. The material must have an appropriate permeability coefficient for the carbon dioxide and hydrogen ion species which are to be sensed. The outer sheath is a membrane made in accordance with U.S. Pat. No. 3,743,588 which is assigned to the same assignee as the present application. This patent and its subject matter are incorporated by reference herein.

With reference to FIG. 1 of the drawing, each electrode is formed in accordance with my invention by employing as each electrode lead a 15 mil of silver wire upon which the successive elements are applied. The central portion of each wire except for about a 1 cm at each end had a first layer of electrical insulation applied thereto. This insulation was in the form of a layer of poly(tetrafluoroethylene) insulation over which an additional coating of electrical insulation of a silicone polycarbonate block copolymer as described in U.S. Pat. No. 3,189,622 was applied. In addition to its insulating properties, the copolymer provides improved adhesion for the subsequent abutting or overlapping outer sheath. An electrochemically active region of silver and a silver halide other than a fluoride was formed in electrical contact with each electrode lead by chloriding by anodization for 5 minutes at 0.6 ma in a 0.1 M sodium chloride solution. The opposite exposed ends (not shown) were provided for subsequently applying electrical leads thereto. The electrochemically active region of the carbon dioxide insensitive electrode was coated with an electrolyte containing 80 mM sodium bicarbonate and 150 mM sodium chloride. Both electrolytes were immobilized with a guar gum gelling agent. Each electrolyte was in contact with its respective active region. An outer sheath of a hydrogen ion and carbon dioxide permeable material of a hydrophobic elastomerpolymer with a dielectric constant of from 4 to 13, and a specific ion carrier such as described in U.S. Pat. No. 3,743,588 is then applied encapsulating the respective electrically active region and electrolyte of each lead.

In FIG. 2, there is shown a carbon dioxide and pH sensor which employs the carbon dioxide insensitive hydrogen ion electrode 11 and bicarbonate ion electrode 17 of FIG. 1 positioned in a sample solution 23 within container 24. A reference electrode 28 is positioned also in sample solution 23. Electrode 28 is connected by an electrical lead 29 to a second high impedance voltmeter 30. Lead 25 from hydrogen ion electrode 14 is connected to both volmeters 27 and 30 by a common lead 31. Electrode 28 can be a reference electrode of the type shown in U.S. Pat. No. 3,705,089 which is assigned to the same assignee as the present invention. This patent and its subject matter are hereby incorporated by reference. Electrode 28 comprises a polyolefin tube 32 with a silver wire 33 extending outwardly at the upper end which is bonded thereto. A portion 34 of wire 33, which portion is within the tube 32, has a coating of silver chloride thereon. A gelled salt solution 35 is within tube 32 and in contact with portion 34 and in contact at its open end with sample solution thereby providing a liquid contact for the reference electrode. The terminal voltage read at 30 between the carbon dioxide insensitive hydrogen ion electrode 11 and the reference electrode 28 during sensor operation will be a function of pH of solution 23 while the terminal voltage read at 27 between electrodes 10 and 11 will be a function of carbon dioxide partial pressure.

It will be appreciated that the carbon dioxide insensitive hydrogen ion electrode 11 shown in FIG. 1 or in FIG. 2 can also be any other electrode which is sensitive to the pH of a sample solution in which it is immersed but insensitive to carbon dioxide partial pressure, as for example a glass pH electrode.

Examples of in vitro sensors made in accordance with my invention are as follows:

EXAMPLE 1

Ten sensors were built starting with poly(tetraflouroethylene) polymer insulated, 0.015 inch diameter silver wire cut into 5 inch lengths. The poly(tetrafluoroethylene) polymer insulation was first stripped off a 1 cm length at one end by rotating the insulated wire against a small diameter heated wire to cut the insulation at that point. The stripped end of each 5 inch long wire was placed in the chuck of a hydraulic wire dipping apparatus by means of which most of the rest of the length of the wire was dipped into, and slowly pulled out of, a $CH_2Cl_2$ solution containing approximately 25% poly(siloxane)poly(bisphenol-A carbonate) block copolymer as described in U.S. Pat. No. 3,189,622 and then dried in nitrogen gas. The resulting coat of the copolymer over the primary poly(tetrafluoroethylene) polymer insulation increases adherence of the subsequent hydrogen permselective polymer applied at a later stage.

The combined insulation was then stripped from a 1 cm length at the opposite end of the wire from that previously stripped. The newly exposed silver was immersed for 10 seconds in 35 percent nitric acid to roughen its surface, chlorided anodically by passing a current of 0.6 milliamperes for 5 minutes in 0.1M NaCl, rinsed briefly in distilled water, and dried in air.

Gelled electrolyte solution was next applied to each chlorided silver tip using a pneumatic ram device. With this device the tip of the wire was immersed for 10 seconds in the gelled electrolyte solution, then suddenly withdrawn to produce a smooth, thin coating.

Two kinds of gelled electrolyte were used. The first gelled electrolyte was to provide five carbon dioxide insensitive hydrogen ion electrodes while the second gelled electrolyte was to provide five carbon dioxide sensitive hydrogen ion electrodes. To one batch of five wires was applied an electrolyte containing 0.5g of a guar gum gelling agent dispersed into 24.5ml of an aqueous solution containing 80mM NaCl, 2mM disodium hydrogen phosphate, and 82mM potassium dihydrogen phsophate, having a pH of approximately 5 and a total osmolality of approximately 330 mOsm. To a second batch of five wires was applied a bicarbonate containing electrolyte prepared by dispersing 0.5g of the same gelling agent into 24.5ml of an aqueous solution containing 6.5mM and $NaHCO_3$ and 150mM NaCl, having a total osmolality of approximately 313 MOSM. The gelling agent was Stein, Hall & Co., Inc. Polymer 705D-B gelling agent.

The sensor construction was completed by applying the hydrogen ion permselective membrane. A solution of 4.95g of a hydrophobic elastomer-polymer with a dielectric constant of from 4 to 13 as described in U.S. Pat. No. 3,743,588, plus 50 mg of p-octadecyloxy-m-chlorophenyl hydrazone mesoxalonitrile as described in the same patent was dissolved in approximately 10g $CH_2Cl_2$ by rotating a containing vessel overnight on a miniature jar mill. The actual $CH_2Cl_2$ content of this solution was later adjusted as needed to yield the viscosity required for satisfactory coating. The solution was centrifuged to remove dust or other particles, then placed in a pumped device that continuously recirculates the solution so that a fresh, horizontal liquid surface is always available. Using the hydraulic wire dipping apparatus, the vertically held wire was dipped far enough into the solution that not only the chlorided tip previously covered with gelled electrolyte was immersed, but also an additional 1–2 cm portion of the combined insulations. The wire was then withdrawn slowly, dried for one minute in the apparatus in nitrogen gas, then removed from the apparatus and air dried for 10–30 minutes more.

The ten completed sensors, so prepared, were stored in aqueous solutions identical in electrolyte composition to that of their respective internal gelled electrolytes.

The above sensor preparation is described on pages 2-5 of patent notebook number 10,123, dated September 5-14, 1973. Sensors prepared with buffered internal electrolyte were designated: 1, 2, 3, 4, and 5. Those prepared with bicarbonate internal electrolyte were designated: 6, 7, 8, 9, and 10.

EXAMPLE 2

In order for the sensor to function properly the $H^+$-ion permselective barrier must be leak-free. In order to check this point the trans-membrane electrical conductance of each sensor was measured. The active tip of the sensor was immersed in a 150mM NaCl solution along with a dhlorided silver wire, and the electrical impedance between the inner silver element of the sensor and the external chlorided silver wire measured with a General Radio type 1615-A capacitance bridge, at a frequency of 100Hz with the following results as shown in Table I.

TABLE I

| Sensor | Conductance ($\mu$Mho) |
|---|---|
| 1 | 0.0333 |
| 2 | 11.4 |
| 3 | 0.0365 |
| 4 | 0.0999 |
| 5 | 0.0442 |
| 6 | 0.0448 |
| 7 | 0.0365 |
| 8 | 0.0384 |
| 9 | 0.0347 |
| 10 | 0.0332 |

The conductances of eight of the sensors grouped fairly closely together at between 0.033 and 0.045 $\mu$Mho. One, No. 2, clearly had a leak, and another, No. 4, was somewhat suspect, since its conductance was more than twice as great as that of the remaining eight.

On the basis of these results, two sensors 1 and 3, with buffered internal electrolyte, and the two sensors, 6 and 7 with bicarbonate internal electrolyte were selected for further experiments.

EXAMPLE 3

Response was measured to pH in buffers equilibrated only with atmospheric carbon dioxide ($pCO_2 \approx 0$). The four selected sensors and a Beckman type 40471 glass pH electrode along with a saturated calomel reference electrode were electrically connected through an Orion model 855 six-position electrode switch to an Orion model 801 digital pH meter, so that the four sensors and the glass electrode could be measured in turn against the saturated calomel reference electrode. The digital readings, in millivolts, were displayed on a teletypewriter.

The six electrodes were placed first in one buffered solution, nominal pH=7.4, then in a second buffered solution, nominal pH=6.5, and the change in potential, against the reference electrode, recorded as follows below in Table II. The measurements were performed at room temperature, 25 degrees Centigrade.

TABLE II

|  | Glass | Buffered Sensors | |
|---|---|---|---|
|  |  | No. 1 | No. 3 |
| mV Change | 54.2 | 54.1 | 54.0 |
| pH Response (Glass=100%) | (100%) | 99.8% | 99.6% |
|  | Glass | Bicarbonate Sensors | |
|  |  | No. 6 | No. 7 |
| mV Change | 54.2 | 49.1 | 50.9 |
| pH Response (Glass=100%) | (100%) | 90.6% | 93.9% |

These readings were taken within about one minute of the time the sensors were removed from one solution and placed, without washing, in the other. The essentially theoretical response of the buffered sensors occurred immediately on this time scale, with no subsequent drift. The two sensors with bicarbonate internal electrolyte, on the other hand, exhibited considerable drift, as might be expected, since their internal pH is uncontrolled under these conditions. The fact that, even so, they gave 1 minute responses of more than 90% of ideal was remarkable.

EXAMPLE 4

The response to carbon dioxide was tested using the same electrodes, but they now were immersed in a nominally 150mM NaCl solution in an apparatus that allows the solution to equilibrate with gases of known $CO_2$ content. The 150mM NaCl solution, and the included sensors, were equilibrated in turn with gas mixtures containing 2.66 percent $CO_2$ in air and 10.08 percent $CO_2$ in air, as analyzed by the gas supplier. The following changes in potential, relative to the saturated calomel electrode were observed as shown below in Table III. The measurements were performed at room temperature, 25 degrees Centigrade.

TABLE III

|  | Glass | Buffered Sensors | |
|---|---|---|---|
|  |  | No. 1 | No. 3 |
| mV Change | 31.1 | 29.6 | 29.4 |
| pH Response (Glass=100%) | (100%) | 95.2% | 94.5% |
|  | Glass | Bicarbonate Sensors | |
|  |  | No. 6 | No. 7 |
| mV Change | 31.1 | −2.0 | −2.7 |
| pH Response (Glass=100%) | (100%) | — | — |

The response to $pCO_2$ was calculated from the mV values in this table by taking the difference between the value for either of the first pair of sensors, either 1 or 3, and that for either of the second pair, either 6 or 7. This yields the four values shown below, which are there compared with the expected change, at 25 degrees Centigrade, $59.4 \log_{10}(10.08/2.66) = 34.3$, computed from $CO_2$ analyses made by the gas supplier. These results are shown below in Table IV.

TABLE IV

|  | Ideal | No. 1 less No. 6 | No. 1 less No. 7 |
|---|---|---|---|
| mV Change | 34.3 | 31.6 | 32.3 |
| $pCO_2$ Response | (100%) | 91.9% | 94.0% |
|  | Ideal | No. 3 less No. 6 | No. 3 less No. 7 |
| mV Change | 34.3 | 31.4 | 32.1 |
| $pCO_2$ Response | (100%) | 91.4% | 93.4% |

The $pCO_2$ response is good, but less than ideal, in each instance.

While other modifications of the invention and variations thereof which may be embraced within the scope of the invention have not been described, the invention is intended to include such as may be embraced within the following claims.

What I claim as new and desire to secure by Letters Patent of the United States is:

1. A carbon dioxide sensor which comprises a carbon dioxide insensitive hydrogen ion electrode comprising a flexible metallic elongated electrode lead, an electrochemically active region at one end adhering tightly to and in electrical contact with the electrode lead, electrical insulation surrounding the remainder of the electrode lead, an electrolyte containing a hydrogen ion buffering system and an ion which enters into equilibrium with the electrochemically active region of the lead contacting the electrochemically active region, and an outer sheath of a membrane selectively permeable to hydrogen ion and also permeable to carbon dioxide encapsulating the electrochemically active region and the electrolyte, the hydrogen ion permeable membrane material being a hydrophobic elastomer with a dielectric constant of from 4 to 13, and a hydrophobic and lipophilic $H^+$ ion carrier; a separate, spaced apart, carbon dioxide sensitive hydrogen ion electrode comprising a flexible, elongated electrode lead, an electrochemically active region at one end adhering tightly to and in electrical contact with the electrode lead, electrical insulation surrounding the remainder of the electrode lead, an unbuffered electrolyte containing bicarbonate ions and an ion which enters into equilibrium with the electrochemically active region of the lead contacting the electrochemically active region, and an outer sheath of a membrane selectively permeable to hydrogen ions and also permeable to carbon dioxide encapsulating the electrochemically active region and the electrolyte, the hydrogen ion permeable and carbon dioxide permeable membrane material being a hydrophobic elastomer with a dielectric constant of from 4 to 13, and a hydrophobic and lipophilic $H^+$ ion carrier; and the electrodes being electrically connected.

2. A carbon dioxide sensor as in claim 1, in which each electrochemically active region is silver and a silver halide other than a fluoride.

3. A carbon dioxide sensor as in claim 1, in which the electrolyte is an immobilized aqueous solution.

4. A carbon dioxide sensor as in claim 1, in which the hydrophobic and lipophilic $H^+$ ion carrier is p-octadecyloxy-m-chlorophenylhydrazone mesoxalonitrile.

5. A carbon dioxide and pH sensor which comprises a carbon dioxide insensitive hydrogen ion electrode comprising a flexible metallic elongated electrode lead at one end of which there is an electrochemically active region adhering tightly to and in electrical contact with the electrode lead, electrical insulation surrounding the remainder of the electrode lead, an electrolyte containing a hydrogen ion buffering system and an ion which enters into equilibrium with the electrochemically active region of the lead contacting the electrochemically active region, and an outer sheath of a membrane selectively permeable to hydrogen ions and also permeable to carbon dioxide encapsulating the electrochemically active region and the electrolyte, the hydrogen ion permeable membrane being a hydrophobic elastomer with a dielectric constant of from 4 to 13, and a hydrophobic and lipophilic $H^+$ ion carrier; a separate, spaced apart carbon dioxide sensitive hydrogen ion electrode electrode comprising a flexible, elongated electrode lead, an electrochemically active region at one end adhering tightly to and in electrical contact with the electrode lead, electrical insulation surrounding the remainder of the electrode lead, an unbuffered electrolyte containing bicarbonate ions and an ion which enters into electrochemical equilibrium with the active region of the lead contacting the electrochemically active region, and an outer sheath of a membrane selectively permeable to hydrogen ions and also permeable to carbon dioxide encapsulating the electrochemically active region and the electrolyte, the hydrogen ion and carbon dioxide permeable membrane being a hydrophobic elastomer with a dielectric constant of from 4 to 13, and a hydrophobic and lipophilic $H^+$ ion carrier; and a separate, spaced apart reference electrode; said carbon dioxide insensitive electrode being electrically connected to said carbon dioxide sensitive electrode and to said reference electrode.

6. A carbon dioxide and pH sensor as in claim 5, in which each electrochemically active region is silver and a silver halide other than a fluoride.

7. A carbon dioxide and pH sensor as in claim 5, in which the electrolyte is an immobilized aqueous solution.

8. A carbon dioxide and pH sensor as in claim 5, in which the hydrophobic and lipophilic $H^+$ ion carrier is p-octadecyloxy-m-chlorophenylhydrazone mesoxalonitrile.

* * * * *